(12) United States Patent
Ibaragi

(10) Patent No.: US 9,871,385 B2
(45) Date of Patent: Jan. 16, 2018

(54) POWER FEEDING DEVICE AND POWER RECEIVING DEVICE FOR CONTACTLESS POWER TRANSMISSION

(71) Applicant: Murata Manufacturing Co., Ltd., Nagaokakyo-shi, Kyoto-fu (JP)

(72) Inventor: Hiroshi Ibaragi, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 204 days.

(21) Appl. No.: 14/937,965

(22) Filed: Nov. 11, 2015

(65) Prior Publication Data
US 2016/0064953 A1 Mar. 3, 2016

Related U.S. Application Data

(63) Continuation of application No. PCT/JP2014/051956, filed on Jan. 29, 2014.

(30) Foreign Application Priority Data

May 14, 2013 (JP) ................................. 2013-101970

(51) Int. Cl.
*H02J 5/00* (2016.01)
*H01F 38/14* (2006.01)
(Continued)

(52) U.S. Cl.
CPC ............. *H02J 5/005* (2013.01); *H01F 27/02* (2013.01); *H01F 27/402* (2013.01); *H01F 38/14* (2013.01);
(Continued)

(58) Field of Classification Search
CPC .. H02J 5/005; H02J 50/60; H02J 50/10; H02J 7/025; H01F 27/02; H01F 27/402; H01F 38/14
See application file for complete search history.

(56) References Cited

U.S. PATENT DOCUMENTS 8,573,843 B2* 11/2013 Tsuchida ............. G01K 13/002
374/112
9,178,377 B2* 11/2015 Rejman ................... H02J 7/047
2008/0164839 A1 7/2008 Kato et al.

FOREIGN PATENT DOCUMENTS

CN 101304178 A 11/2008
JP 11-178202 A 7/1999
(Continued)

OTHER PUBLICATIONS

Official Communication issued in International Patent Application No. PCT/JP2014/051956, dated Mar. 11, 2014.

*Primary Examiner* — Jung Kim
(74) *Attorney, Agent, or Firm* — Keating & Bennett, LLP

(57) ABSTRACT

A power feeding device includes a cover, a primary coil covered with the cover, and a plurality of temperature-sensitive detectors provided in the cover, which detect the temperature of an object on the cover. When the distance between adjacent temperature-sensitive detectors is denoted by W [m], the temperature of the object to be subjected to thermometry by the temperature-sensitive detectors is denoted by $T_0$ [K], the temperature to be detected by the temperature-sensitive detectors is denoted by $T_1$ [K], and the thermal conductivity of the cover is denoted by $\lambda$ [W/(m·K)], W satisfies the following equation $$W \leq 25 \times 10^{-3} - \frac{17.2 \times \lambda}{\ln\left(\frac{20}{T_0 - T_1}\right)} \times 10^{-3}. \quad (1)$$

This allows the power feeding device to accurately detect the temperature of the object on the cover.

20 Claims, 4 Drawing Sheets

(51) Int. Cl.
*H01F 27/02* (2006.01)
*H01F 27/40* (2006.01)
*H02J 7/02* (2016.01)
*H02J 50/10* (2016.01)
*H02J 50/60* (2016.01)

(52) U.S. Cl.
CPC .............. *H02J 7/025* (2013.01); *H02J 50/10* (2016.02); *H02J 50/60* (2016.02)

(56) References Cited

FOREIGN PATENT DOCUMENTS

| | | |
|---|---|---|
| JP | 2008-017562 A | 1/2008 |
| JP | 2009-264803 A | 11/2009 |
| JP | 2010-252538 A | 11/2010 |
| JP | 2010-288429 A | 12/2010 |
| JP | 2011-222773 A | 11/2011 |
| JP | 2012-228123 A | 11/2012 |
| JP | 2013-005682 A | 1/2013 |
| JP | 2013-017247 A | 1/2013 |
| JP | 2013-030551 A | 2/2013 |
| WO | 2012/047779 A1 | 4/2012 |

\* cited by examiner

POWER FEEDING DEVICE AND POWER RECEIVING DEVICE FOR CONTACTLESS POWER TRANSMISSION

BACKGROUND OF THE INVENTION

1. Field of the Invention

The present invention relates to a power feeding device and a power receiving device that transmit and receive power in a contactless manner.

2. Description of the Related Art

Conventionally, examples of this type of power feeding device include, for example, a contactless charger as described in Japanese Patent Application Laid-Open No. 2008-017562. The contactless charger is configured to have the form of a sheet or a box. The upper surface of the contactless charger is provided with four mounting surfaces for devices to be charged. When devices to be charged are set, the devices to be charged start to be charged.

Thermistor parts are provided respectively under the respective mounting surfaces, and the respective thermistor parts measure the temperatures of objects (devices to be charged or foreign objects) on the corresponding mounting surfaces. Each thermistor part includes a flexible substrate, a plurality of thermistors as a typical example of a plurality of temperature-sensitive means, a case, and a heat conductor, which is fixed on a resin frame. The plurality of thermistors is disposed in a grid on the flexile substrate. It is to be noted that it is also possible to provide the thermistor parts in the devices to be charged as power receiving devices.

However, the power feeding devices, etc. have a problem that the temperatures of objects to be subjected to thermometry may be unable to be detected accurately when the distance from a thermistor to the next thermistor is excessively long in the case of a plurality of thermistors disposed in a grid. Conversely, when the distance is shortened between adjacent thermistors, there is a need to increase the total number of thermistors, and the cost will be increased for manufacturing the power feeding devices, etc.

SUMMARY OF THE INVENTION

Preferred embodiments of the present invention provide a power feeding device and a power receiving device which are able to accurately detect temperatures of an object to be subjected to thermometry.

According to an aspect of various preferred embodiments of the present invention, a power feeding device and a power receiving device that transmit and receive power in a contactless manner to a power receiving device include a cover, a coil covered with the cover, and a plurality of temperature-sensitive detectors provided in the cover, which detect the temperature of an object to be subjected to thermometry on the cover.

When a distance between adjacent temperature-sensitive detectors among the plurality of temperature-sensitive detectors is denoted by W [m], the temperature of the object to be subjected to thermometry by the temperature-sensitive detectors is denoted by $T_0$ [K], the temperature to be detected by the temperature-sensitive detectors is denoted by $T_1$ [K], and the thermal conductivity of the cover is denoted by $\lambda$ [W/(m·K)], W satisfies the following equation (1).

Formula 1

$$W \leq 25 \times 10^{-3} - \frac{17.2 \times \lambda}{\ln\left(\frac{20}{T_0 - T_1}\right)} \times 10^{-3} \quad (1)$$

According to the aspect described above, the design such that the distance W between the adjacent temperature-sensitive detectors has a numerical value defined by the above equation (1) makes it possible to accurately detect the temperature of the object to be subjected to thermometry on the cover.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A power feeding device according to preferred embodiments of the present invention will be described below with reference to the drawings.

Figure 1:
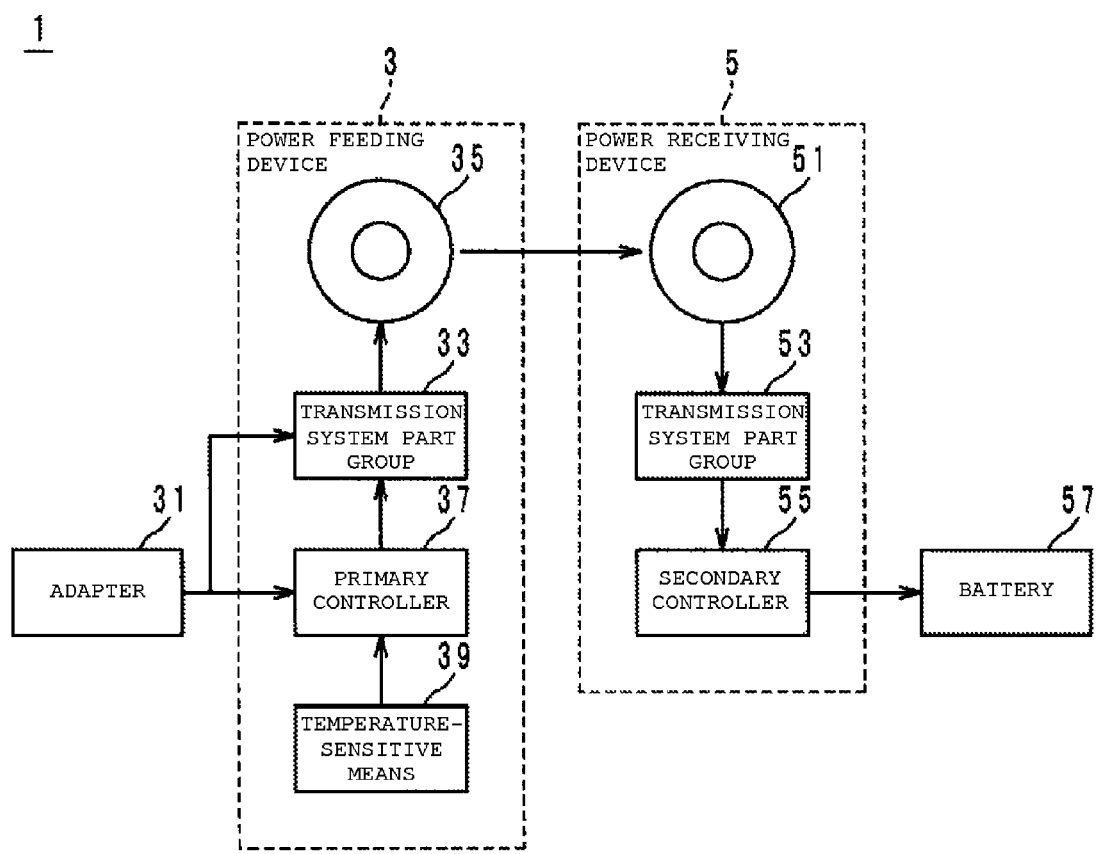
FIG. 1 is a block diagram illustrating the configuration of a contactless power transmission system including a power feeding device and a power receiving device according to a preferred embodiment of the present invention.

In FIG. 1, a contactless power transmission system 1 includes a power feeding device 3. The power feeding device 3, in order to charge a power receiving device 5 such as a smartphone or a tablet, generally includes an adapter 31, a transmission system part group 33, a primary coil 35, a primary controller 37, and a plurality of temperature-sensitive detectors 39. In this regard, the part group 33, the coil 35, and the controller 37 are, as shown by dashed lines in FIGS. 2A and 2B, disposed on a base 311, and covered with a cover 313. In contrast, the power receiving device 5 includes, as shown in FIG. 1, a secondary coil 51, a transmission system part group 53, and a secondary controller 55. Details and operations for each component will be described below.

When the power receiving device 5 to be subjected to thermometry is placed on the cover 313 of the power feeding device 3, contactless power transmission is started from the power feeding device 3 to the power receiving device 5. During the power transmission, the adapter 31 supplies an alternating-current voltage (for example, 100 V) from a commercial power supply, to the transmission system part group 33. The transmission system part group 33 includes at least one of a rectifier circuit, a smoothing circuit, an inverter circuit, etc. The rectifier circuit and the smoothing circuit convert the input alternating-current voltage to a direct-current voltage. The inverter circuit performs switching or the like of the output direct-current voltage from the smoothing circuit to generate an alternating-current voltage with a predetermined frequency (for example, several tens kHz). When this alternating-current voltage is applied to the coil 35, the coil 35 generates an alternating-current magnetic field. The foregoing operation is controlled by the controller 37.

When the power receiving device 5 is placed on the cover 313, the secondary coil 51 is located over the primary coil with the cover 313 interposed therebetween. Thus, the alternating-current magnetic field generated by the coil 35 undergoes interlinkage with the coil 51, and an alternating-current voltage is induced across both ends of the coil 51, and applied to the transmission system part group 53. The transmission system part group 53 includes a rectifier circuit, etc., and rectifies an alternating current flowing with the induced voltage, and supplies the rectified current to the battery 57 disposed outside the power receiving device 5. Thus, the battery 57 is charged. The foregoing operation is controlled by the controller 55.

Overheating Detection

On the cover 313, not only the power receiving device 5 is placed, but also metal foreign bodies may be located thereon. In order to detect overheating of the objects (the power receiving device 5 and metal foreign bodies), the power feeding device 3 is provided with the plurality of temperature-sensitive detectors 39.

Figure 2A:
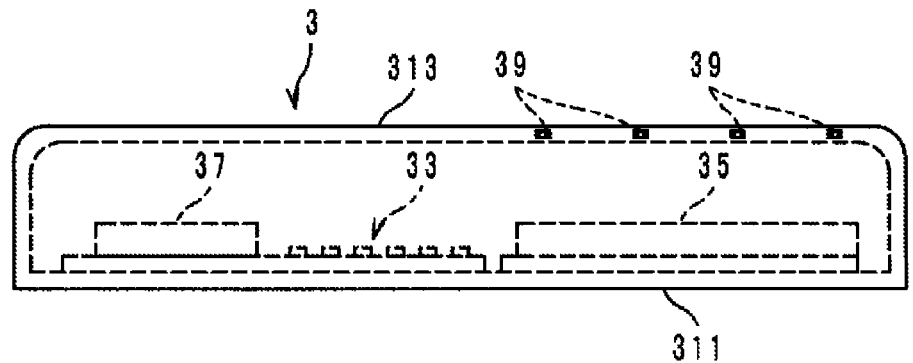
FIG. 2A is a side view of the power feeding device shown in FIG. 1.
Figure 2B:
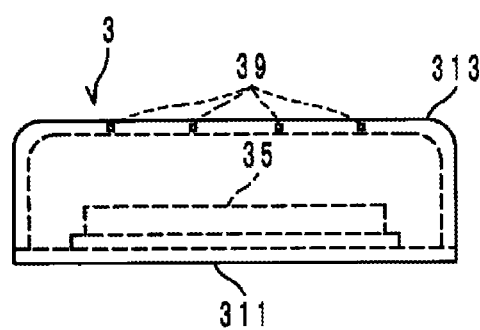
FIG. 2B is a front view of the power feeding device shown in FIG. 1.
Figure 2C:
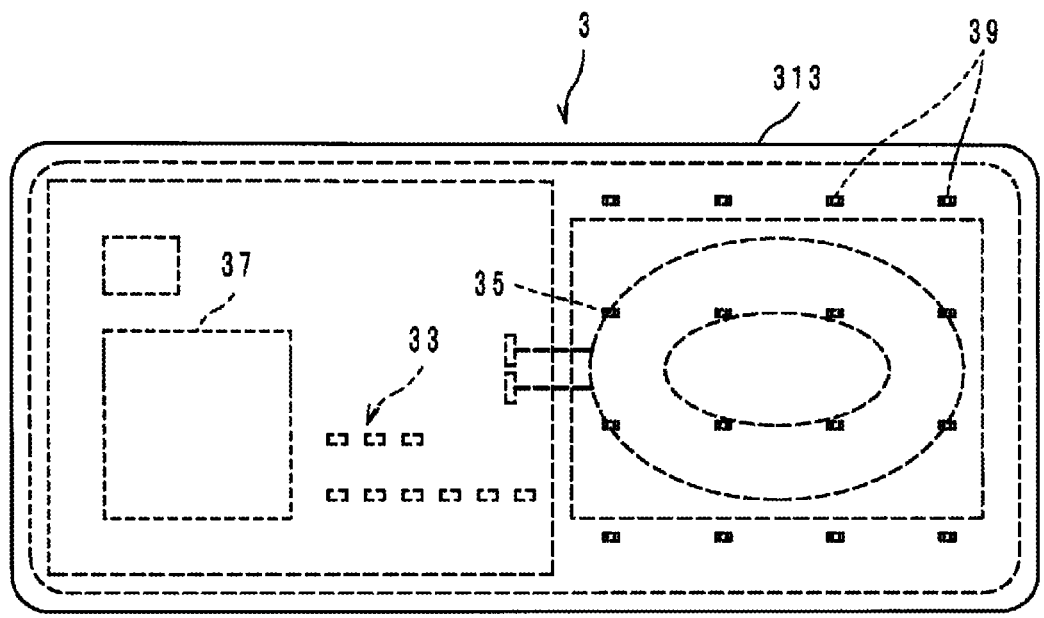
FIG. 2C is a top view of the power feeding device shown in FIG. 1.

Each temperature-sensitive detector 39 is typically a ceramic thermistor with a negative temperature coefficient (referred to as an NTC thermistor). In this regard, each temperature-sensitive detector 39 is preferably a small-size NTC thermistor of, for example, about 7.2 mm$^3$ in volume with a low heat capacity, so as to be able to respond to overheating of the objects at high speed. Examples of the NTC thermistor with this volume include, for example, the type 1005 specified in the JIS. In this regard, when the NTC thermistor is the type 1005 in size, the rectangular mounting surface is 1.0 mm in dimension along the long side, and 0.5 mm in dimension along the short side. In addition, the dimension along the height is, for example, 0.25 mm, although the dimension is not specified in the JIS. In this regard, these dimensions are all designed target values, but not always accurately 1.0 mm, 0.5 mm, and 0.25 mm. More specifically, these dimensions all have tolerances. The temperature-sensitive detectors 39 as described above are provided between the surface of the cover 313 and an upper end of the primary coil 35. FIGS. 2A to 2C show an example of a plurality of temperature-sensitive detectors 39 buried in a grid in the cover 313. Further, in FIG. 2C, from the perspective of legibility, reference numeral 39 is provided for only two NTC thermistors in the upper right corner of the page.

In addition, the power feeding device 3 is often designed so as not to limit the placement position of the power receiving device 5 in consideration of usability for the user, and the user can place the power receiving device 5 in a free position as long as the position is located on the cover 313. In other words, it is not known where on the cover 313 the object to be subjected to thermometry is placed. Therefore, the power feeding device 3 is provided with the plurality of temperature-sensitive detectors 39, that is, a plurality of NTC thermistors in the cover 313. The present preferred embodiment includes, as shown by dashed lines in FIG. 2C, the plurality of temperature-sensitive detectors 39 each buried at a number of different sites in the cover 313. Thus, it becomes possible to detect the temperature at a number of sites on the cover 313.

The plurality of temperature-sensitive detectors 39 each has, for example, fixed resistances, not illustrated, connected in series. To this circuit, a constant voltage is supplied which is generated by a constant-voltage circuit, not illustrated. This circuit outputs, to the controller 37, the voltage-dividing potential with the fixed resistances as temperature information. The controller 37 performs stopping or the like of the power supply to the primary coil 35 when the input temperature information exceeds a predetermined temperature.

In this regard, when adjacent temperature-sensitive detectors are excessively spaced among the plurality of temperature-sensitive detectors 39, there is a possibility of leading to failure to accurately detect the temperature of the object to be subjected to thermometry. Conversely, when the distance is shortened between adjacent temperature-sensitive detectors 39, there is a need to increase the total number of temperature-sensitive detectors 39, and the cost for manufacturing the power feeding device 3 will be increased.

Figure 3:
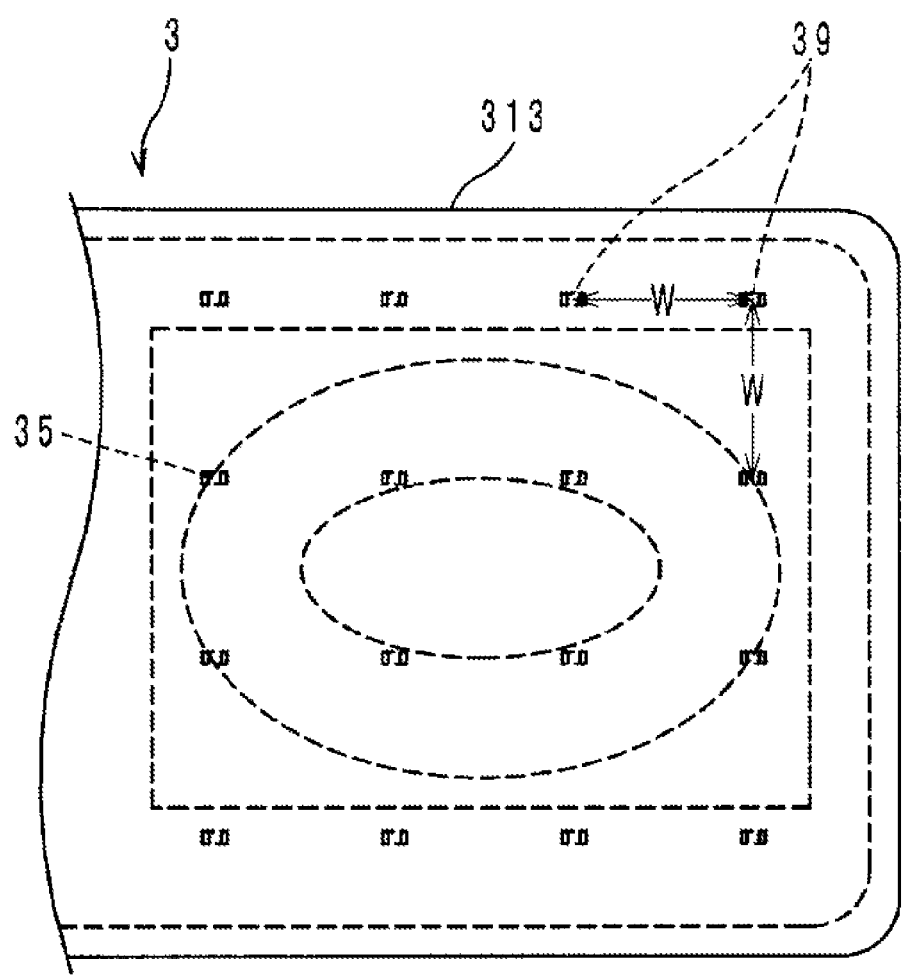
FIG. 3 is a diagram showing parameters related to the distance between the temperature-sensitive detector as shown in FIG. 2A.

In order to solve the problem mentioned above, the inventor of the present application has discovered an equation to derive an appropriate distance W between the adjacent temperature-sensitive detectors 39. Specifically, the object placed on the cover 313 is assumed to be about 25 [mm] or more in size (maximum width). In addition, the temperature of the object is denoted by $T_0$ [K], and the temperature of the object to be detected by the controller 37 is denoted by $T_1$ [K] (provided that $T_1 < T_0$, and the $T_0 - T_1$ is, for example, about 20 [K]). In addition, in accordance with the specifications, the temperature-sensitive detectors 39 detect the temperature $T_1$ within about 20 [sec] after the object temperature reaches $T_0$. In addition, the thermal conductivity of the cover 313 is denoted by $\lambda$ [W/(m·K)]. In this case, as shown in FIG. 3, the distance W [m] between the adjacent temperature-sensitive detectors 39 is designed to have a numerical value that satisfies the following equation (1).

Formula 2

$$W \leq 25 \times 10^{-3} - \frac{17.2 \times \lambda}{\ln\left(\frac{20}{T_0 - T_1}\right)} \times 10^{-3} \quad (1)$$

EXAMPLES

First Example

Figure 4A:
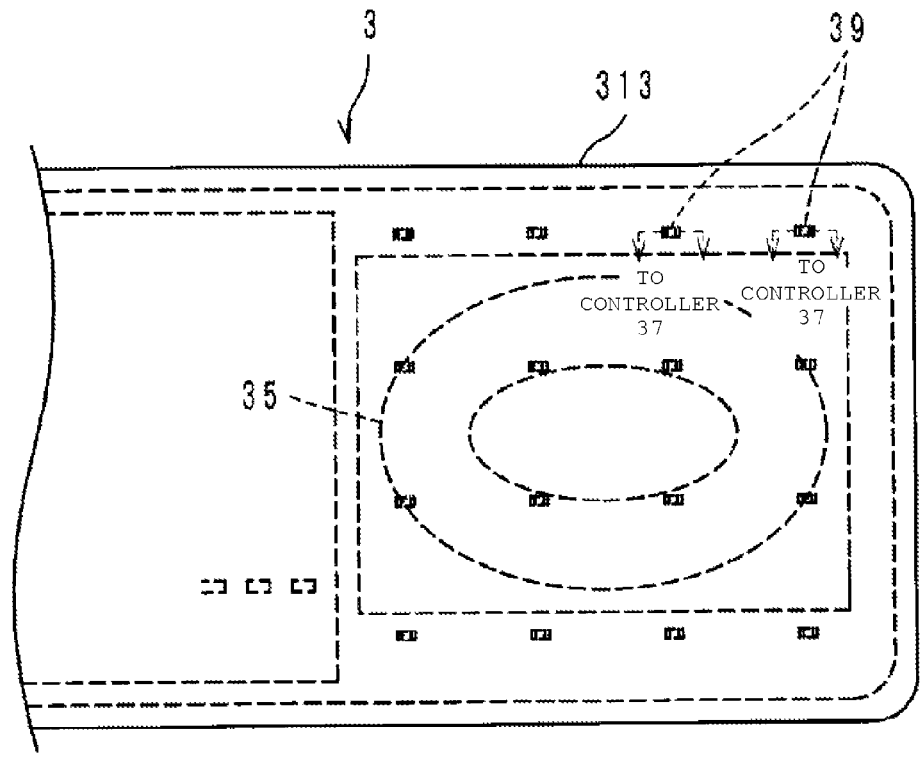
FIG. 4A is a top view illustrating the configuration of a power feeding device according to a first example of a preferred embodiment of the present invention.

The object to be subjected to thermometry is an aluminum piece of about 25 [mm] in diameter. The plurality of temperature-sensitive detectors 39 is, for example, NTC thermistors, and arranged in a grid in top view. More specifically, the distances W from a temperature-sensitive detector 39 to the two vertically adjacent temperature-sensitive detectors 39 are equal or substantially equal to each other, and the distances W from the one temperature-sensitive detector 39 to the two horizontally adjacent temperature-sensitive detectors 39 are equal or substantially equal to each other. In addition, each temperature-sensitive detector 39 is buried in the cover 313 at a distance of about 1 [mm] from the surface of the cover 313 toward the primary coil 35. In addition, the respective NTC thermistors are individually connected to the controller 37 as shown in FIG. 4A. It is to be noted that reference numeral is provided for only two NTC thermistors in the upper right corner of the page in FIG. 4A as in FIG. 2C.

In addition, the material of the cover 313 is an epoxy resin with a thermal conductivity $\lambda$ of about 0.25 [W/(m·K)]. In addition, when the aluminum piece is put on the cover 313, a magnetic field such that the temperature $T_0$ of the aluminum piece is increased to 150 [° C.] under a calm condition at 25 [° C.] is supposed to be generated from the primary coil 35. In this case, in order to rapidly detect overheat of the aluminum piece, the temperature-sensitive detectors 39 detect the temperature $T_1$ of about 130 [° C.] within about 20 [sec] after the aluminum piece reaches about 150 [° C.] in accordance with the specifications. In accordance with the specifications, the distance W is approximately 25.235 [mm] or less, for example.

It is to be noted that in the first example, in addition, $T_0$ and $T_1$ are substituted in terms of absolute temperature in the equation (1), while $T_0$ and $T_1$ are referred in terms of degrees C. which is common in Japan, not in terms of absolute temperature, in the text and table from the perspective of ease of understanding.

The inventor of the present application actually prepared, with the eight distances W shown in Table 1 below, temperature detection circuits with type 1005 NTC thermistors of three sides: 1.0 [mm]×0.5 [mm]×0.5 [mm] buried as the plurality of temperature-sensitive detectors 39 in the cover 313 made of an epoxy resin (referred to as evaluation samples No. 1 to No. 8 in Table 1). In regard to the sample No. 1, the distance W was made to be 31 [mm], and the distance L of the sample No. 2 was made to be 30 [mm]. In regard to the samples Nos. 3 to 8, the distance W is as listed in Table 1.

TABLE 1

Change in Detected Temperature $T_1$ with Distance W in Example 1

| Sample No. | Distance W [m] | Detected Temperature $T_1$ [° C.] | Temperature Difference $T_0 - T_1$ [° C.] | OK/NG |
|---|---|---|---|---|
| 1 | 31 | 84.0 | 66.0 | NG |
| 2 | 30 | 91.6 | 58.4 | NG |
| 3 | 29 | 101.2 | 48.8 | NG |
| 4 | 28 | 113.4 | 36.6 | NG |
| 5 | 27 | 128.0 | 22.0 | NG |
| 6 | 26 | 142.0 | 8.0 | OK |
| 7 | 25 | 147.4 | 2.6 | OK |
| 8 | 23 | 147.4 | 2.6 | OK |

The inventor put the power feeding device 3 under a calm environment at an ambient temperature of 25 [° C.], and placed the aluminum piece to be detected on the cover 313 for each sample. To explain more specifically, the aluminum piece is placed at a site such that the center of the piece is farthest from each temperature-sensitive element 39. Then, the temperature was checked by all of the temperature-sensitive detectors 39 at about 20 [sec] after the aluminum piece reached about 150 [° C.]. Then, among the temperature of all of the temperature-sensitive detectors 39, the maximum temperature was as the temperature $T_1$. It is to be noted that except for the distance W and the temperature $T_1$, the parameters $T_0$ and $\lambda$ are described above.

The measurement results are as shown in Table 1, and in the case of the samples Nos. 1 to 5, the temperature $T_1$ is lower than about 130 [° C.], and the temperature difference $(T_0-T_1)$ is greater than about 20 [° C.]. It is determined that when the distance W fails to satisfy the equation (1) as just described, the temperature of the object on the cover 313 has failed to be accurately detected in accordance with the specifications. In contrast, in the case of the samples Nos. 6 to 8, the temperature $T_1$ is about 130 [° C.] or higher, and the temperature difference $(T_0-T_1)$ is about 20 [° C.] or less. It is determined that when the distance W satisfies the equation (1) as just described, the existence of the aluminum piece is able to be detected accurately, due to the fact that any of the temperature-sensitive detectors 39 detected about 130 [° C.] within about 20 [sec] after the object on the cover 313 reached about 150 [° C.] as designed for the target.

As described above, when the distance W from the surface of the cover 313 to the temperature-sensitive detectors 39 in the power feeding device 3 is designed on the basis of the equation (1), the distance W comes to approximately correspond to the designed target, and the temperature of the object on the cover 313 is able to be accurately detected. Therefore, as long as the design conditions of $\lambda$, $T_1$, and $T_0$ are provided, it becomes possible to figure out the appropriate distance W without repeating the trial production and evaluation of the cover 313 with the temperature-sensitive detectors 39 buried therein. Thus, the design efficiency of the power feeding device 3 is improved.

Second Example

Figure 4B:
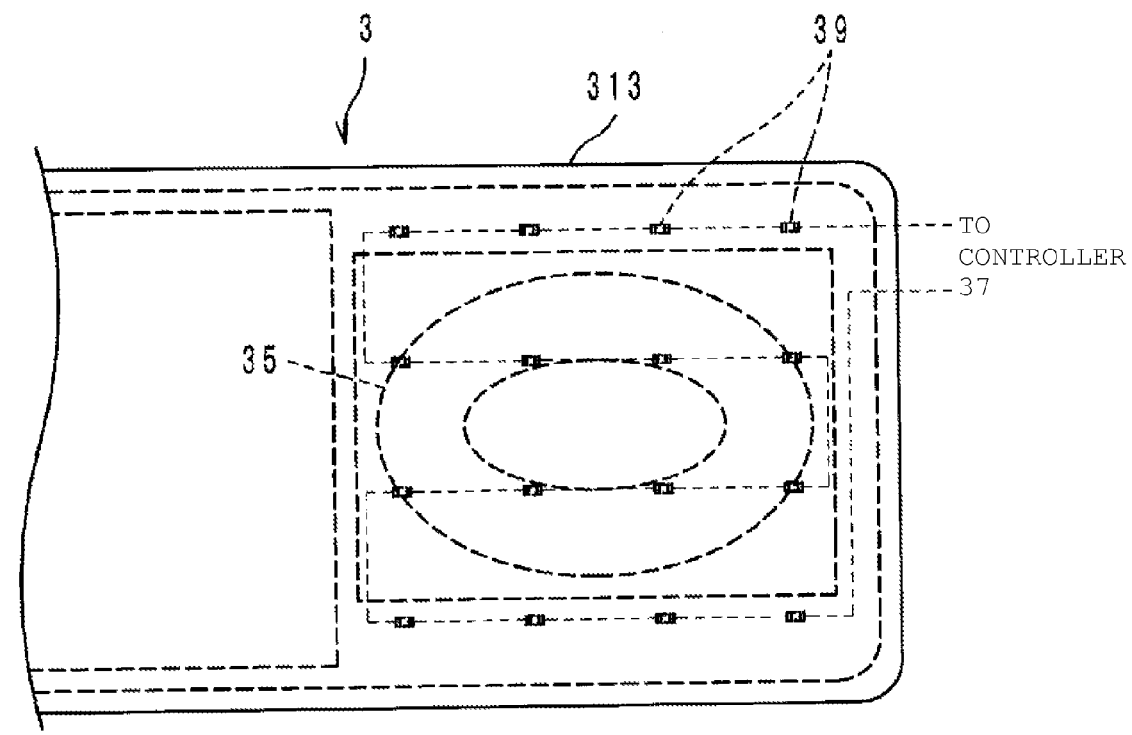
FIG. 4B is a top view illustrating the configuration of a power feeding device according to a second example of a preferred embodiment of the present invention.

The inventor further prepared, for the material of the cover 313, glass with a thermal conductivity $\lambda$ of 0.17 [W/(m·K)], instead of the epoxy resin. In addition, for the respective temperature-sensitive detectors 39, thermistors with positive temperature characteristics (hereinafter, referred to as PTC thermistors) with a Curie temperature of 100 [° C.] and a resistance value of 470 [Ω] at 25 [° C.] were adopted instead of the NTC thermistors. A plurality of such temperature-sensitive detectors 39 was prepared, and arranged in a grid at the distance W of about 2.5 [cm] inside the cover 313. In addition, the respective temperature-sensitive detectors 39 are arranged in a row as shown in FIG. 4B, and the both ends are connected to the controller 37.

In the present example, when the temperature $T_1$ reached about 120 [° C.] with a predetermined object to be detected put on the cover 313, the object to be detected is determined as in overheating.

The inventor used four types of PTC thermistors different in size from each other to constitute temperature detection circuits (referred to as evaluation samples No. 9 to No. 12 in Table 2), as shown in Table 2 below. Specifically, the evaluation sample No. 9 included a plurality of PTC thermistors of type 1608 (approximately 1.02 mm$^3$ in volume) arranged in a row. The evaluation sample No. 10 included a plurality of PTC thermistors of type 2012 (approximately 2.16 mm$^3$ in volume) arranged in a row. The sizes of the samples Nos. 11 and 12 are as listed in Table 2.

TABLE 2

Time to Detection of Temperature
$T_1$ with respect to Thermistor Volume V

| Sample No. | Size [mm] | Volume V [mm³] | 10 [sec] | 20 [sec] | 30 [sec] |
|---|---|---|---|---|---|
| 9 | 1.6 × 0.8 × 0.8 | 1.02 | Detected | Detected | Detected |
| 10 | 2.0 × 1.2 × 0.9 | 2.16 | Not detected | Detected | Detected |
| 11 | 3.2 × 2.5 × 0.9 | 7.20 | Not detected | Detected | Detected |
| 12 | 4.5 × 3.2 × 0.9 | 12.96 | Not detected | Not detected | Not detected |

Then, it was checked how many seconds after putting the object to be detected on the cover 313 were taken for each sample to detect about 120 [° C.]. The results are as shown in Table 2, and each sample has succeeded in detecting about 120 [° C.] within about 30 [sec] as long as the volume of the PTC thermistor is about 7.20 mm³ or less. In contrast, when the volume of the PTC thermistor is greater than about 7.20 mm³, each sample has failed to detect about 120 [° C.].

It is determined that in the second example, a predetermined temperature is able to be accurately detected quickly after putting an object on the cover 313, as long as the PTC thermistor as an example of the temperature-sensitive detector 39 is about 7.20 mm³ in volume while the distance W satisfies the equation (1).

In the above preferred embodiments of the present invention, the distance W has been described in the case of providing the temperature-sensitive detectors 39 in the cover 313 of the power feeding device 3. However, the present invention is not limited thereto, but the power receiving device 5 may include a plurality of temperature-sensitive detectors 39 in a cover, and the distance W between adjacent temperature-sensitive detectors 39 may be defined on the basis of the equation (1).

In the above preferred embodiments of the present invention, the power feeding device 3 has been described for the application of charging smartphones, tablets, etc. However, the present invention is not limited thereto, the power feeding device 3 may be intended for the application of charging consumer devices such as electric cars and shavers.

In addition, the NTC thermistors and the PTC thermistors have been given as examples of the temperature-sensitive detectors 39 in the above examples. However, the thermistors may be not only ceramic thermistors, but also thermistors prepared from polymer materials.

In addition, the NTC thermistors are not limited to the type 1005, but may be type 3225, type 3216, type 2012, type 1608, type 0603, or type 0402. In this regard, the dimensions of the mounting surfaces are as listed in Table 3 below along the long side, along the short side, and along the height.

TABLE 3

Size of NTC Ceramic Thermistor

| Type | Dimension along Long Side [mm] | Dimension along Short Side [mm] | Dimension along Height [mm] |
|---|---|---|---|
| 3225 | 3.2 | 2.5 | 1.0 |
| 3216 | 3.2 | 1.6 | 1.0 |
| 2012 | 2.0 | 1.2 | 1.0 |
| 1608 | 1.6 | 0.8 | 0.4 |
| 1005 | 1.0 | 0.5 | 0.25 |
| 0603 | 0.6 | 0.3 | 0.15 |
| 0402 | 0.4 | 0.2 | 0.1 |

The power feeding device and power receiving device according to various preferred embodiments of the present invention are able to accurately detect overheat of an object on the cover, and preferred for contactless charging systems such as smartphones, tablet terminals, or electric cars.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A power feeding device for supplying power in a contactless manner to a power receiving device, the power feeding device comprising:
   a cover;
   a coil covered with the cover; and
   a plurality of temperature-sensitive detectors provided in the cover, which detect a temperature of an object on the cover; wherein
   a distance between adjacent ones of the plurality of temperature-sensitive detectors is denoted by W [m], a temperature of an object to be subjected to thermometry by the temperature-sensitive detectors is denoted by $T_0$ [K], a temperature to be detected by the temperature-sensitive detectors is denoted by $T_1$ [K], and a thermal conductivity of the cover is denoted by λ [W/(m·K)], W satisfies:

$$W \leq 25 \times 10^{-3} - \frac{17.2 \times \lambda}{\ln\left(\frac{20}{T_0 - T_1}\right)} \times 10^{-3}.$$

2. The power feeding device according to claim 1, wherein the temperature-sensitive detectors include a plurality of thermistors arranged in a row.

3. The power feeding device according to claim 1, wherein the temperature-sensitive detectors are thermistors of about 7.20 mm³ or less in volume.

4. The power feeding device according to claim 1, wherein the temperature-sensitive detectors include thermistors of type 1005.

5. The power feeding device according to claim 1, further comprising an adapter, a transmission system part group, a primary coil, and a primary controller.

6. The power feeding device according to claim 5, wherein the transmission system part group includes at least one of a rectifier circuit, a smoothing circuit, and an inverter circuit.

7. The power feeding device according to claim 2, wherein the plurality of thermistors are buried in the cover.

8. The power feeding device according to claim 1, wherein each of the temperature-sensitive detectors is one of a positive temperature coefficient thermistor and a polymer thermistor.

9. The power feeding device according to claim 1, wherein the temperature-sensitive detectors are thermistors of type 3225, type 3216, type 2012, type 1608, type 0603, or type 0402.

10. A contactless power transmission system comprising the power feeding device according to claim 1.

11. A power receiving device for receiving power transmitted in a contactless manner from a power feeding device, the power receiving device comprising:
a cover;
a coil covered with the cover; and
a plurality of temperature-sensitive detectors provided in the cover, which detect a temperature of an object on the cover; wherein
a distance between adjacent ones of the plurality of temperature-sensitive detectors is denoted by W [m], a temperature of an object to be subjected to thermometry by the temperature-sensitive detectors is denoted by $T_0$ [K], a temperature to be detected by the temperature-sensitive detectors is denoted by $T_1$ [K], and a thermal conductivity of the cover is denoted by $\lambda$ [W/(m·K)], W satisfies:

$$W \leq 25 \times 10^{-3} - \frac{17.2 \times \lambda}{\ln\left(\frac{20}{T_0 - T_1}\right)} \times 10^{-3}.$$

12. The power receiving device according to claim 11, wherein the temperature-sensitive detectors include a plurality of thermistors arranged in a row.

13. The power receiving device according to claim 11, wherein the temperature-sensitive detectors are thermistors of about 7.20 mm$^3$ or less in volume.

14. The power receiving device according to claim 11, further comprising a secondary coil, a transmission system part group and a secondary controller.

15. The power receiving device according to claim 14, wherein the transmission system part group includes at least one rectifier circuit.

16. The power receiving device according to claim 11, wherein the temperature-sensitive detectors include thermistors of type 1005.

17. The power receiving device according to claim 12, wherein the plurality of thermistors are buried in the cover.

18. The power receiving device according to claim 11, wherein each of the temperature-sensitive detectors is one of a positive temperature coefficient thermistor and a polymer thermistor.

19. The power receiving device according to claim 11, wherein the temperature-sensitive detectors are thermistors of type 3225, type 3216, type 2012, type 1608, type 0603, or type 0402.

20. A contactless power transmission system comprising the power receiving device according to claim 11.

* * * * *